Feb. 25, 1964    H. E. ENGLESON ETAL    3,122,229
DEVICE FOR STORING ARTICLES ALONG A CONVEYER
Filed Aug. 29, 1960    3 Sheets-Sheet 1
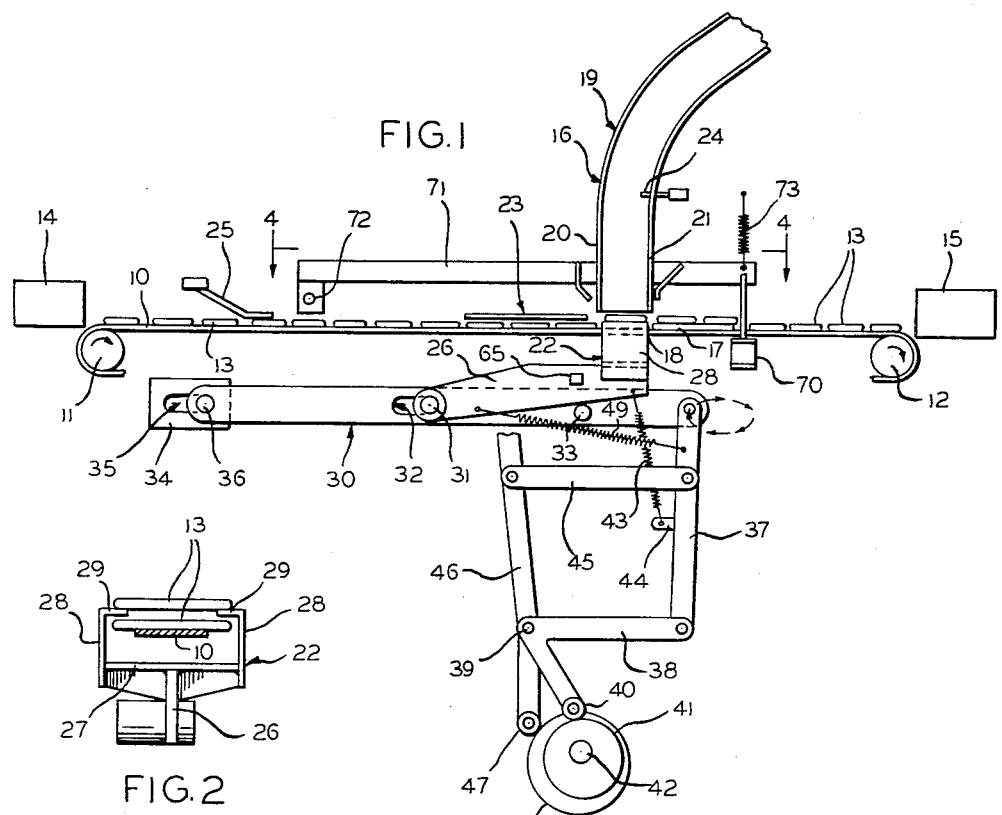
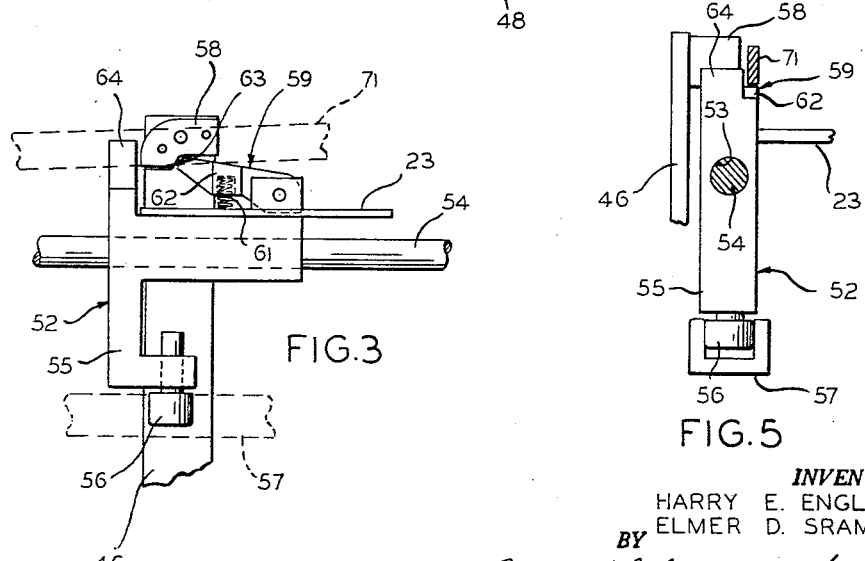
INVENTORS
HARRY E. ENGLESON
ELMER D. SRAMEK
BY Marzall, Johnston, Cook & Root
ATTORNEYS

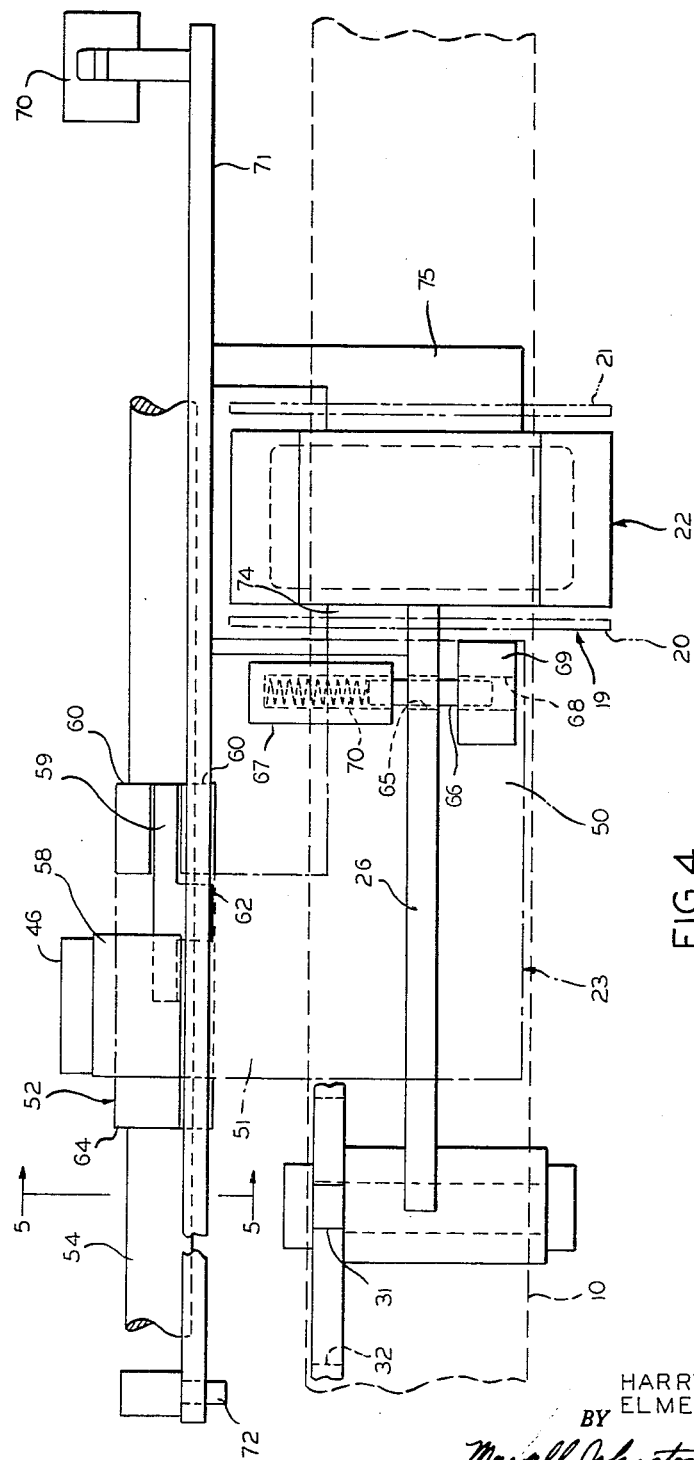

3,122,229
DEVICE FOR STORING ARTICLES ALONG
A CONVEYER
Harry E. Engleson, Chicago, and Elmer D. Sramek, Cicero, Ill., assignors, by mesne assignments, to Crompton & Knowles Packaging Corporation, Holyoke, Mass., a corporation of Massachusetts
Filed Aug. 29, 1960, Ser. No. 52,504
13 Claims. (Cl. 198—35)

This invention relates to a device for storing a plurality of articles along a conveyer arranged to deliver articles between machines for handling and packaging the articles, and more particularly to a stacking device arranged along a conveyer for removing articles from the conveyer and stacking the articles into a magazine.

The present invention is particularly useful in association with a multipacker that may be defined as a machine for receiving a continuous supply of articles and packing the articles into containers. More specifically, a multipacker of the type concerned would take a plurality of articles, stack the articles into block form and pack the articles into a container such as a tray. Accordingly, such a multipacker would be a cycling machine wherein a certain number of articles to be packed in a container would be stacked in block form and a container would be prepared from blank form for receiving the block form stack of articles. Thus, it is necessary with the multipacker of the cycling type to shut down the machine when an insufficient supply of articles is being received by it between cycles of operation, thereby necessitating a minimum number of articles to be available at all times when the machine is in operation in order to complete each cycling operation. The term "article" as used herein includes single articles or small packages of individual elements such as gum or candies, or any other element which might be packed in groups in a container.

The device for storing articles along a conveyor according to the present invention includes a magazine arranged above the conveyer for receiving and storing articles. A stop or abutment is arranged along the conveyer to stop the advancement of the articles in alignment below the magazine, whereupon they are lifted into the magazine by an elevator. A pusher is arranged adjacent the magazine to push the articles one at a time from the magazine and onto a deadplate. From the deadplate, the articles are further pushed onto the conveyer for advancement onto a multipacker or the like. Means is provided for disabling the pusher if the multipacker is down or if the supply of articles in the magazine falls below a predetermined number. Further, means is provided to disable the elevator if the supply of articles along the conveyer and to the magazine is interrupted, and if the supply of articles to the magazine is interrupted with the elevator disabled, a continuous supply of articles will be fed to the multipacker from the magazine by the pusher until the supply is indicated as low in the magazine and after a sufficient number is supplied to complete a cycling operation of the multipacker. Because of the supply stored by the magazine, the length of the conveyer between the multipacker and the source of supply of articles may be reduced without sacrificing a sufficient supply of articles to the multipacker for completion of a cycle of operation, for it should be appreciated that only a certain number of articles may be carried on the conveyer at any one time. Further, providing a storage supply of articles in the magazine reduces the down time of the multipacker upon interruption of the supply of articles to the conveyer.

Accordingly, it is an object of this invention to provide a device for storing articles along a conveyer ahead of a machine for packing articles into containers.

A further object of this invention is in the provision of a device for storing articles along a conveyer arranged to deliver a supply of articles to a machine for cyclicly packing a certain number of articles in a container, thereby permitting a shorter conveyer run between the machine and the source of supply to the conveyer and further providing a reserve supply for the packing machine should the source of supply be interrupted.

A still further object of this invention resides in the provision of a device for storing a plurality of articles in a magazine along a belt conveyer employed to deliver articles between a packaging machine and a multipacker, wherein the device is capable of reducing the shut down time of the multipacker while also serving to provide a sufficient supply of articles to the multipacker at all times for completing a cycle of operation.

A further object of this invention is to provide a device for storing articles along a belt conveyer including a magazine arranged above the conveyer, an abutment mounted above the belt conveyer to stop the advancing of articles by the conveyer in alignment with the bottom end of the magazine, an elevator for lifting the articles one at a time from the conveyer and into the magazine, a pusher for discharging the articles from the magazine one at a time and onto a deadplate, and means for selectively disabling operation of the elevator and/or pusher in accordance with the associated operating conditions.

A still further object of the invention is in the provision of a device for storing articles along a conveyer arranged to take articles from the source of supply to a multipacker, and including a magazine for storing a plurality of articles along a conveyer, wherein detector means is provided ahead of the magazine to detect the condition of the supply of articles and a detector means is provided in the magazine to detect the supply of articles therein.

Other objects, features and advantages of the invention will be apparent from the following detailed disclosure, taken in conjunction with the accompanying sheets of drawings, wherein like reference numerals refer to like parts, in which:

FIG. 1 is a front elevational view, partially diagrammatic and having some parts broken away and other parts omitted for clarity, of the device for storing articles along a conveyer according to the invention and illustrating movement of articles between a source of supply and a multipacker.

FIG. 2 is an end elevational view of the elevator and illustrating its relationship with the belt conveyer and articles handled thereby;

FIG. 3 is an enlarged detail view of the latch and pusher carrier;

FIG. 4 is an enlarged top plan view of the device for storing the articles according to the invention and taken generally along line 4—4 of FIG. 1;

FIG. 5 is an end elevational view of the pusher and latch carrier and taken substantially along line 5—5 of FIG. 4;

Figures 6, 7:
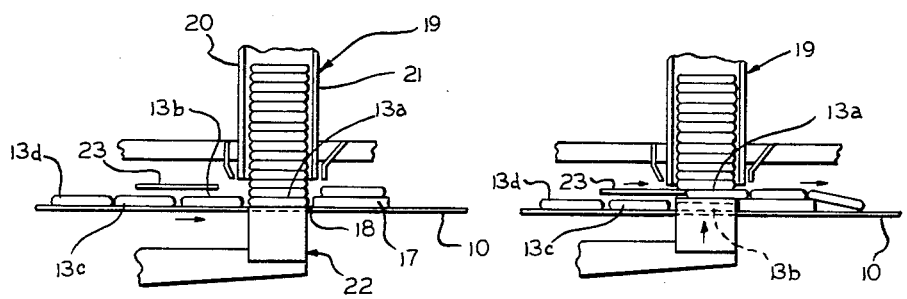
FIGS. 6, 7, 8 and 9 are diagrammatic views of the device of the invention and illustrating the various operational parts in various positions during the operation thereof.

Referring now to the drawings, and particularly to FIG. 1, a belt conveyer including a belt 10 trained around longitudinally spaced pulleys 11 and 12, serves to convey articles 13 between a source of supply 14 and a machine for packing the articles into containers and hereinafter referred to as a multipacker, designated by the numeral 15. The source of supply 14 may be a machine for packing items of one kind or another into a package which constitutes an article 13. For example, the machine 14 may be a packager of sticks of gum to provide gum packages to be packed into containers such as trays.

The multipacker 15 serves to stack a plurality of articles 13 into block form and pack the block form of articles into a container such as a tray, wherein the tray is formed from a blank and prepared for receiving the block form of articles. Accordingly, the multipacker operates cyclicly wherein each cycle includes the stacking of a predetermined number of articles, the preparation of the tray blank and the packing of the stack of articles into the tray blank, and it is always necessary to complete a cycle of operation before shut down of the multipacker, unless the multipacker malfunctions during a cycle of operation. Thus, if the supply of articles to the multipacker is deficient, such deficiency must be determined so that the multipacker may be stopped at the end of a cycle of operation, which necessitates the providing of a sufficient supply of articles even when a deficiency is detected so that a cycle of operation can be completed.

Where the source of supply 14 constitutes a machine for preparing the articles 13, such as a gum packager, and it is known that supply interruptions often are encountered in such a machine, stopping and starting of the multipacker 15 is necessitated. Further, since the multipacker demands a certain supply of articles for each cycle of operation, it usually necessitates a long belt conveyer connecting the gum packager and the multipacker.

The device for storing a supply of articles along a belt conveyer, according to the invention, is generally designated by the numeral 16 and serves to permit a supply of articles to be stored immediately in advance of the multipacker thereby eliminating the necessity of providing a long belt conveyer, thereby conserving floor space for the entire operation. Further, the providing of a storage supply of articles along the conveyer eliminates the necessity of shutting down the multipacker 15 upon the interruption of the source of supply coming from a gum packager or the like, thereby providing an overall greater efficiency in the system.

The device 16 for storing articles includes a deadplate 17 mounted along and above the conveyer belt 10 to define an abutment or stop 18 against which the leading edge of the articles 13 will engage and be restrained from moving further along the conveyer. A magazine 19 extends upwardly from the conveyer and has its lower open end arranged to align with the articles stopped by the abutment 18, and includes generally opposed walls 20 and 21 extending transversely of the conveyer. The articles 13 are lifted one at a time from the conveyer belt 10 and into the magazine 19 by an elevator, generally designated by the numeral 22. A pusher 23 discharges articles from the magazine 19, one at a time, and onto the deadplate 17. The articles 13 are then pushed from the deadplate and back onto the belt conveyer 10 which conveys them to the multipacker 15. A supply of articles 13 is normally maintained in the magazine 19 and the quantity of supply therein is detected by a detector 24. Interruption of the supply of articles to the belt conveyer 10 from the source 14 is detected by a belt detector 25 arranged ahead of the magazine 19. The operation of the storage device 16 is interrelated with the detectors 24 and 25 and the operation of the multipacker 15.

The elevator 22 includes an elongated supporting arm 26 having a generally transversely and horizontally positioned plate 27 mounted on one end thereof for supporting upwardly extending bars 28. Extending inwardly from the upper ends of the bars 28 are supporting lips 29 arranged as seen particularly in FIG. 2 to cooperatively receive the opposite ends of an article 12 and support the article thereon. Thus, the lips 29 are of such a length and close enough together to coact and define a support for the articles 13, and have their innermost edges spaced apart a distance greater than the width of the belt 10. Therefore, it may be appreciated that the opposite ends of an article 13, when positioned on the belt 10, will extend beyond the opposite edges of the belt 10.

The end of the elevator supporting arm 26 opposite from the end receiving the bars 28 is pivotally and slidably mounted to an oscillating lever 30 by means of a shaft 31 or the like, FIG. 4, being received in a longitudinally extending slot 32 formed in the lever 30. A stop pin 33 extends laterally from the lever 30 and functions to limit movement of the elevator arm 26 in a downward direction.

One end of the oscillating lever 30 is pivotally and slidably carried by a stationary frame part 34. The lever may be similarly mounted as the end of the elevator arm 26, wherein an elongated and substantially horizontally extending slot 35 is provided in the frame part 34 and receives a shaft or the like 36 that is secured to the lever 30. The other end of the lever 30 is pivotally secured to a substantially vertically reciprocable connecting link 37 which is, in turn, pivotally connected at its other end to a crank arm 38. The crank arm 38 is pivotally mounted on a shaft 39, and carries a cam follower 40 in engagement with a cam 41 continuously rotating on a cam shaft 42. Thus, operation of the cam shaft 42 through the cam 41, cam follower 40, crank arm 38 and connecting link 37 functions to impart an oscillating movement to the lever 30 whereby the lever 30 is pivotally oscillated in the slot 35 of the frame part 34. An upward movement of the lever 30 by means of the stop pin 33 imparts an upward movement of the elevator arm 26 and elevator 22. A spring 43 is connected at one end to the elevator arm 26 and at the other end to a bracket 44 carried by the connecting link 37 to thereby impart a downward motion to the elevator during downward motion of the connecting link 37 while yet providing a yieldable connection between the elevator and the connecting link 37.

Longitudinal or substantially horizontal motion is imparted to the oscillating lever 30 by means of a link 45 which is pivotally connected at one end intermediate the connecting link 37 and pivotally connected to the other end intermediate a cam lever 46. The cam lever 46 is also pivotally mounted on the shaft 39, and carries a cam follower 47 at its lower end in engagement with a cam 48 also mounted on the cam shaft 42 and likewise continuously driven. A spring 49 is connected at one end to the elevator arm 26 and at the other end to the connecting link 37 for the purpose of imparting a longitudinal movement to the elevator arm 26 and the elevator 22 when such a movement is imparted to the connecting link 37 through the link 45, the cam lever 46, the cam follower 47 and the cam 48. Accordingly, an orbital movement, including horizontal and vertical components, is imparted to the elevator 22, and this movement is such as to lift the articles one at a time upwardly into the magazine and for the elevator to return without interfering with the advancement of the articles toward the abutment 18 so that the next article may be lifted upwardly into the magazine. As seen particularly in FIG. 2, while the elevator is in the up and left position, another article may move into position against the abutment 18 and below the lips 29 of the elevator, and the elevator then moves forward or in the direction of movement of the articles until the trailing edges of the lips 29 are positioned substantially in alignment with or slightly below the abutment 18 before the downward movement of the elevator is initiated. When the lips 29 have then moved downwardly sufficiently so that the upper surfaces of the lips are below the bottom surface of the next article 13 on the conveyer belt 10, rearward movement of the elevator may be effected to reposition it below the next article so that it may be lifted into the magazine.

The pusher 23 comprises a relatively thin L-shaped plate member including a pushing portion 50 and a supporting portion 51. The pushing portion is arranged in longitudinal alignment with the belt conveyor 10, while the supporting portion extends laterally of the pushing portion and of the belt 10. The supporting portion 51 is secured to a pusher and latch carrier 52 having an elongated horizontally extending guide hole 53 slidably received on a horizontally extending stationary slide bar 54. The carrier includes a depending portion 55 mounting a carrier guide roller 56 rotatable about a vertical axis. The roller 56 is guidably received in an elongated carrier guide track 57 stationarily mounted below the slide bar 54. Thus, the track mounted guide roller 56 prevents relative rotation betwen the carrier 52 and the slide bar 53.

Reciprocable movement is imparted to the carrier 52 by the cam lever 46 which has mounted at its upper end a latch receiver 58. As seen in FIG. 5, the cam lever 46 is positioned to one side of the carrier 52 and to the side away from the pusher 23. Forward movement of the carrier 52 in the direction of movement of the belt conveyer is imparted through the latch receiver 58 by its engagement with a latch 59 carried on the carrier 52. The latch 59 is pivotally mounted at one end between upstanding bifurcated supporting parts 60, and urged continually upwardly by a spring 61 bottomed on the pusher supporting portion 51 at one end and in a recessed portion of a laterally extending control portion 62. The free end of the latch 59 is engageably received in a notch 63 of the latch receiver 58. Thus, the notch defines a surface engageable with the latch to impart movement to the latch and the carrier upon movement of the cam lever and latch receiver in the direction of belt movement or to the right as viewed in FIG. 3. Return of the carrier to its retracted position is effected by an upstanding abutment 64 mounted at the left-hand end of the carrier 52 and in the path of movement of the latch receiver 58. Thus, the latch receiver 58 engages the abutment 64 during the stroke of the cam lever in the direction opposite to the movement of the belt 10.

A sequential operation of the elevator and pusher is illustrated in FIGS. 6 and 7. As seen in FIG. 6, article 13a has been advanced by the belt conveyer against the abutment 18 of the deadplate 17 so that it is arranged below the lower open end of the magazine 19. The article 13a is then lifted upwardly into the magazine as seen in FIG. 7, the elevator then permitting further advance of the line of articles so that the article 13b may come into position against the abutment 18. In the operation of the elevator, the pusher 23 operates to discharge the article 13a from the magazine and onto the deadplate 17. The subsequent discharge of the article 13b would advance the article 13a off the deadplate and onto the conveyer belt 10. Normal operation of the elevator and pusher would not store further articles in the magazine, and the article just lifted into the magazine by the elevator would always be the one discharged onto the deadplate, while the supply of articles already in the magazine would remain in the magazine but would have slightly upward and downward movement during operation of the elevator.

Figures 8, 9:
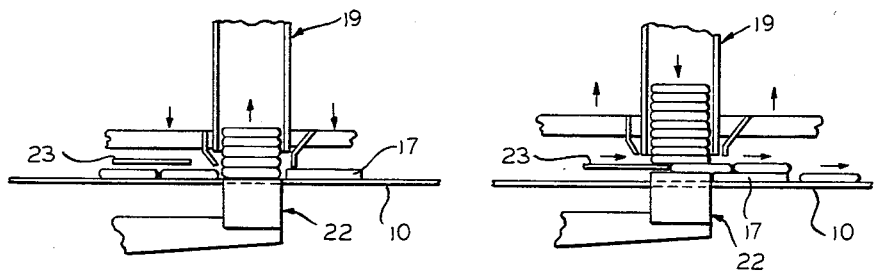

Should the supply of articles 13 be interrupted and so detected by the detector 25, it would then be necessary to use the supply of articles in the magazine. In order to use the magazine supply, it is necessary to stop operation of the elevator in its upper and left position as illustrated in FIG. 9, while permitting the pusher to continue operation. Stopping of the elevator 22 in this position is accomplished by an opening 65 in the elevator supporting arm 26 which aligns with an elevator stop pin 66 during orbital movement of the arm. As seen in FIG. 4, the elevator stop pin constitutes the plunger of an elevator control solenoid 67 stationarily mounted so that when the pin is in protracted position it will extend through the opening 65 of the elevator supporting arm 26 and further be received in a hole 68 of a stationary frame part 69. The solenoid is provided with a spring 70a for protracting the pin 66 when the solenoid is deenergized. Upon alignment of the opening 65 of the elevator supporting arm 26 during its orbital movement, and when the solenoid 70 is deenergized, the pin 66 will snap into the position shown in FIG. 4 and hold the elevator 22 in its upper and left position. Energizing of the solenoid 70 retracts the pin 66 against the action of the spring 70a and disconnects the solenoid pin from the elevator supporting arm 26 and thereby permits continued operation of the elevator. During the time that the pin 66 engages in the opening of the elevator supporting arm, the spring 49 yields and the shaft 31 on the supporting arm slides in the slot 32 relative to the oscillating lever 30.

When the multipacker 15 is not operating or shut down for any reason or when the supply of articles in the magazine 19 is low as detected by the detector 24 and the multipacker has completed a cycle of operation, the pusher 23 is rendered non-operative so that a jam up of articles is not created between the magazine and the multipacker. Rendering the pusher non-operative is effected by energization of a latch and gate control bar solenoid 70 which pulls down a latch and gate control bar 71 pivotally mounted at one end at 72. Thus, the plunger of the solenoid is connected to the outer end of the latch and gate control bar 71. Upon deenergization of the solenoid 70, a spring 73 connected at one end to the outer end of the bar and at the other end to a stationary member functions to return the latch and gate control bar upwardly to its normal position as seen in FIGS. 1, 3, 6 and 7. The latch and gate control bar 71 is shown in a down position in FIG. 8 and in that position the bar depresses the latch 59 inasmuch as it engages the control portion 62 of the latch, and thereby disconnects the latch 59 with the latch receiver 58. In the down position of the latch 59, the latch receiver, during its forward stroke or motion to the right as viewed in FIG. 3, passes freely over the latch 59 thereby leaving the carrier 52 in its retracted position. Gate members 74 and 75 extend laterally from the latch and gate control bar 71, and when the latch and gate control bar is in down position as demanded when the solenoid 70 is energized, the gate members close the gaps at the opposed sides of the magazine 19, FIG. 8, to eliminate the possibility of an article becoming misaligned so as to cause the elevator 22 to malfunction in lifting articles into the magazine. Further, the gate member 74 precludes the movement of the pusher into the magazine when such would not be desired. And when the pusher is rendered non-operative, the elevator continues to operate to deliver articles into the magazine for subsequent storage.

Figure 11:
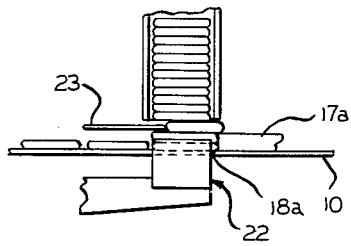
FIG. 11 is a diagrammatic view similar to FIG. 7 but illustrating a modification of the invention.

An alternative embodiment of the invention is shown in FIG. 11 which differs from the embodiment already described in that the deadplate 17a is arranged a greater distance above the conveyor belt 10, wherein the height of the abutment 18a is nearly twice the thickness of two articles 13 rather than approximately once the thickness of an article as in the first embodiment. In this embodiment, as seen in FIG. 11, the article just elevated by the elevator is not immediately discharged from the magazine, but rather the previous article elevated is discharged. This embodiment reduces the imparation of movement from the elevator 22 to the article being discharged from the magazine, thereby further reducing the possibility of malpositioning an article during the elevating operation which might cause a jam.

Figure 10:
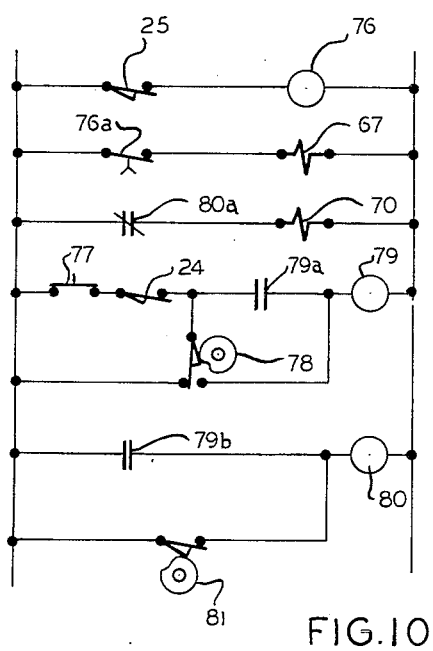
FIG. 10 is an electrical schematic diagram of the combined electrical circuitry operating the invention and controlling the operation of the multipacker as associated with the invention.

Referring now to FIG. 10, an electrical schematic of the circuitry operating the storage device is shown along with the circuitry interconnecting same with the multipacker operation. It is necessary to interconnect the circuitry of the storage device and the multipacker in order to provide proper cooperation therebetween.

A time delay relay 76 is connected in series with the belt detector 25 in order to prevent operation of the gum elevator where only a single article has engaged and closed the belt detector 25. Thus, upon a continuous supply of articles for a predetermined period of time, the time delay relay 76 will close contacts 76a to operate the elevator control solenoid 67 and permit operation of the elevator 22.

An on-off switch 77 is provided on the multipacker for controlling its operation and is normally closed as shown in FIG. 10. Assuming the conditions that there is an insufficient supply 7 of articles in the magazine 19, at which time the elevator would be operating and the pusher would be non-operative, and the supply in a magazine becomes great enough to actuate and operate the magazine detector 24, at which time it would be all right to begin operation of the multipacker, closing of the detector 24 will not immediately initiate action of the multipacker. A cam operated switch 78 is mounted on the continuously running cam shaft 42 of the storage device and only permits the operation of a relay 79 which closes the contacts 79a and 79b when the cam lever 46 is in the retracted or left position. Closing of the contact 79a operates to hold the relay 79 in operation until either the detector 24 or the on-off switch 77 is opened. Upon closing of the contacts 79b of the relay 79, a relay 80 is operated to open the normally closed contacts 80a and deenergize the latch and gate bar control solenoid 70. Deenergizing the solenoid 70 permits the latch and gate control bar to move upwardly thereby opening the gaps at the opposed walls of the magazine and permitting the latch 59 to engage the latch receiver 58 for pusher operation.

Upon depleting the supply of articles in the magazine so that the detector 24 is actuated to open, the relay 79 will be deenergized to open contacts 79a and 79b. However, since the relay 80 serves to control the operation of the gate and latch control bar solenoid 70, and it is important that the multipacker completes its cycle of operation, the relay 80 will not be deenergized until the end of a cycle of operation as determined by a cam operated switch 81 which by-passes the contacts 79b and is mounted on the continuously driven drive shaft of the multipacker. Thus, the by-pass circuit including the switch 81 precludes the stopping of the multipacker until a cycle of operation has been completed.

Opening of the belt detector 25 deenergizes the relay 76 to open contacts 76a and deenergize the elevator control solenoid 67 and stop the gum elevator 22 in its upward and left position. And opening of the magazine detector 24 deenergizes the relay 79 when the end of the cycle of operation of the multipacker has been attained and thereby further deenergizes the whole circuit as established by contacts 79a and the contact of the cam operated switch 78.

During normal operation when the multipacker is operating properly and a sufficient supply of articles is being received by the conveyer belt 10, the elevator and pusher will be in continuous operation to lift articles one at a time from the conveyer into the magazine and discharge the articles one at a time from the magazine back onto the conveyer. If there is detected an interruption of articles to the magazine by the belt detector 25, the elevator is locked in the up and left position to thereby permit the pusher to discharge one at a time the articles from the magazine supply. This assures continued operation of the multipacker even if a sufficient supply of articles is not being conveyed to the magazine.

When the magazine detector 24 detects a low supply of articles in the magazine, the multipacker will subsequently stop after completing a cycle of operation and the pusher 23 will be latched back into stationary position after the cycle of operation of the multipacker has been completed. However, if the supply of articles is again detected as substantially continuous, the elevator will begin to operate to again fill the magazine with articles.

When the multipacker is shut down, and the magazine detector 24 detects a low supply of articles in the magazine, the pusher is rendered non-operative, and when a supply of articles is detected by the belt detector 25, the magazine elevator will commence operation to stack articles in the magazine.

Thus, the pusher 23 is stopped whenever the magazine detector 24 falls out and indicates an insufficient supply of articles in the magazine and at the end of a cycle of operation of the multipacker, or when the multipacker is otherwise stopped by operation of the on-off switch 77 to clear a jam or stop the multipacker for some other reason. And the elevator is rendered non-operative and locked in its upper and left position below the magazine only when the lack of supply is detected on the belt by the belt detector 25 and it is necessary to take sticks from the magazine supply.

It will be understood that modifications and variations may be effected without departing from the scope of the novel concepts of the present invention, but it is understood that this application is to be limited only by the scope of the appended claims.

The invention is hereby claimed as follows:

1. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles from said conveying means to said magazine, means for discharging said articles from the magazine back onto the conveying means, and a deadplate mounted above said conveying means and adapted to first receive the articles discharged from the magazine after which each article is received by said conveying means.

2. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles one at a time from said conveying means to said magazine, means for discharging said articles one at a time from the magazine back onto said conveying means, a deadplate mounted above said conveying means and adapted to first receive each article discharged from the magazine after which each article is received by said conveying means, and means for disabling said magazine discharge means thereby permitting the articles to be successively stacked in the magazine.

3. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles one at a time from said conveying means to said magazine, means for discharging said articles one at a time from the magazine back onto said conveying means, a deadplate mounted above said conveying means and adapted to first receive each article discharged from the magazine after which each article is received by said conveying means, and means for disabling said transfer means thereby permitting articles stored in the magazine to be successively discharged one at a time therefrom by said magazine discharge means.

4. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles one at a time from said conveying means to said magazine, means for discharging said articles one at a time from the magazine back onto said conveying means, a deadplate mounted above said conveying means and adapted to first receive each article discharged from the magazine after which each article is received by said conveying means, means for disabling said magazine discharge means thereby permitting the articles to be successively stacked in the magazine, and means for disabling said transfer means thereby permitting articles stored in the magazine to be successively discharged one at a time therefrom by said magazine discharge means.

5. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles one at a time from said conveying means to said magazine, means for discharging said articles one at a time from the magazine back onto said conveying means, a deadplate mounted above said conveying means and adapted to first receive each article discharged from the magazine after which each article is received by said conveying means, means for disabling said magazine discharge means thereby permitting the articles to be successively stacked in the magazine, and detector means in said magazine for controlling operation of said magazine discharge means.

6. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles one at a time from said conveying means to said magazine, means for discharging said articles one at a time from the magazine back onto said conveying means, a deadplate mounted above said conveying means and adapted to first receive each article discharged from the magazine after which each article is received by said conveying means, means for disabling said transfer means thereby permitting articles stored in the magazine to be successively discharged one at a time therefrom by said magazine discharge means, and detector means above the conveying means ahead of the magazine for controlling operation of said transfer means.

7. In combination with means for conveying articles along a rectilinear path, a device for storing articles in a stack along said conveying means, said device comprising an abutment arranged in the path of said articles and above said conveying means, a magazine extending above the conveying means and positioned relative to said abutment to receive articles stopped thereby, means for transferring said articles one at a time from said conveying means to said magazine, means for discharging said articles one at a time from the magazine back onto said conveying means, a deadplate mounted above said conveying means and adapted to first receive each article discharged from the magazine after which each article is received by said conveying means, means for disabling said magazine discharge means thereby permitting the articles to be successively stacked in the magazine, means for disabling said transfer means thereby permitting articles stored in the magazine to be successively discharged one at a time therefrom by said magazine discharge means, detector means in said magazine for controlling operation of said magazine discharge means, and detector means above the conveying means ahead of the magazine for controlling operation of said transfer means.

8. In combination with a continuously moving endless belt conveyer for conveying articles along a rectilinear path, a device for storing the articles in stacked relationship along and above the conveyer comprising, an abutment position over the belt conveyer and in the path of the articles for stopping the articles at a predetermined location, a magazine extending above said belt conveyer and positioned relative to said abutment to successively receive articles stopped thereby, elevator means for elevating said articles one at a time from the belt conveyer and into said magazine, a deadplate mounted above said belt conveyer and adjacent the magazine, a pusher for discharging articles one at a time from the magazine onto said deadplate and thereafter back onto the belt conveyer, means coupled with detector means in said magazine for disabling the pusher and thereby permitting the articles to be successively stacked in the magazine, and means coupled with detector means above said conveyer detecting articles moving toward said magazine along said belt conveyer for disabling said elevator thereby permitting articles stored in the magazine to be discharged one at a time therefrom by the pusher back onto said belt conveyer.

9. In combination with a multipacker for packing a certain number of articles in a container and a continously driven belt conveyer for conveying articles to be packed to the multipacker, a device for storing a supply of articles in stacked relationship along and above the belt conveyer, said device comprising an abutment positioned over the belt conveyer and in the path of the articles for stopping the articles at a predetermined location, a magazine extending above said belt conveyer and positioned relative to said abutment to successively receive articles stopped thereby, elevator means for elevating the articles one at a time from the belt conveyer to the magazine, a deadplate mounted above said belt conveyer and adjacent the magazine, a pusher for discharging articles one at a time from the magazine onto the deadplate and thereafter back onto the belt conveyer, means for disabling said pusher thereby permitting successive stacking of articles in said magazine, detector means in said magazine and means associated with said multipacker for controlling said pusher disabling means, means for disabling said elevator thereby permitting discharge of said articles one at a time from the magazine and back onto said belt conveyer, and detector means above said belt conveyer ahead of said magazine for controlling said elevator disabling means.

10. The combination as defined in claim 9, wherein the deadplate is spaced above the conveyer a distance substantially equal to one thickness of an article.

11. The combination as defined in claim 9, wherein the deadplate is spaced above the conveyer a distance substantially equal to two thicknesses of an article.

12. In combination with a multipacker for packing a certain number of articles in a container and a continuously driven belt conveyer for conveying articles to be packed to the multipacker, a device for storing a supply of articles in stacked relationship along and above the belt conveyer, said device comprising an abutment positioned over the belt conveyer and in the path of the articles for stopping the articles at a predetermined location, a magazine extending above said belt conveyer and positioned relative to said abutment to successively receive articles stopped thereby, elevator means for elevating the articles one at a time from the belt conveyer to the magazine, a deadplate mounted above said belt conveyer and adjacent the magazine, a pusher for discharging articles one at a time from the magazine onto the dead plate and thereafter back onto the belt conveyer, means for disabling said pusher thereby permitting successive stacking of articles in said magazine, detector means in said magazine and means associated with said multipacker for controlling said pusher disabling means, means for disabling said elevator thereby permitting discharge of said articles one at a time from the magazine and back onto said belt conveyer, detector means above said belt conveyer ahead of said magazine for controlling said elevator disabling means, and means operable concurrently with said pusher disabling means for closing the opposite sides of the magazine through which said pusher moves to prevent accidental movement of the pusher into the magazine and removal of articles from the magazine.

13. In combination with a multipacker for packing a certain number of articles in a container and a continuously driven belt conveyer for conveying articles to be packed to the multipacker, a device for storing a supply of articles in stacked relationship along and above the belt conveyer, said device comprising an abutment positioned over the belt conveyer and in the path of the articles for stopping the articles at a predetermined location, a magazine extending above said belt conveyer and positioned relative to said abutment to successively receive articles stopped thereby, elevator means for elevating the articles one at a time from the belt conveyer to the magazine, a deadplate mounted above said belt conveyer and adjacent the magazine, a pusher for discharging articles one at a time from the magazine onto the deadplate and thereafter back onto the belt conveyer, solenoid operated means for disabling said pusher thereby permitting successive stacking of articles in said magazine, detector means in said magazine and means associated with said multipacker for controlling said pusher disabling means, solenoid operated means for disabling said elevator thereby permitting discharge of said articles one at a time from the magazine and back onto said belt conveyer, and detector means above said belt conveyer ahead of said magazine for controlling said elevator disabling means.

References Cited in the file of this patent

UNITED STATES PATENTS

| | | |
|---|---|---|
| 1,978,004 | Winkley | Oct. 23, 1934 |
| 2,904,941 | Midnight | Sept. 22, 1959 |
| 2,931,524 | Hallenius | Apr. 5, 1960 |
| 2,969,883 | Cargill | Jan. 31, 1961 |